US011859529B2

(12) United States Patent
Kobayashi et al.

(10) Patent No.: US 11,859,529 B2
(45) Date of Patent: Jan. 2, 2024

(54) EXHAUST PURIFICATION DEVICE

(71) Applicant: Mitsubishi Fuso Truck and Bus Corporation, Kawasaki (JP)

(72) Inventors: Tadao Kobayashi, Kawasaki (JP); Kazushige Sugi, Kawasaki (JP)

(73) Assignee: MITSUBISHI FUSO TRUCK AND BUS CORPORATION, Kawasaki (JP)

( * ) Notice: Subject to any disclaimer, the term of this patent is extended or adjusted under 35 U.S.C. 154(b) by 0 days.

(21) Appl. No.: 17/802,741

(22) PCT Filed: Feb. 22, 2021

(86) PCT No.: PCT/JP2021/006538
§ 371 (c)(1),
(2) Date: Aug. 26, 2022

(87) PCT Pub. No.: WO2021/172250
PCT Pub. Date: Sep. 2, 2021

(65) Prior Publication Data
US 2023/0082302 A1    Mar. 16, 2023

(30) Foreign Application Priority Data
Feb. 28, 2020  (JP) ................................ 2020-033259

(51) Int. Cl.
*F01N 3/28* (2006.01)
*F01N 13/08* (2010.01)
(52) U.S. Cl.
CPC ........... *F01N 3/2892* (2013.01); *F01N 13/08* (2013.01); *F01N 2470/18* (2013.01)
(58) Field of Classification Search
CPC .... F01N 2240/20; F01N 3/035; F01N 3/2892; F01N 2450/30; F01N 2470/02; F01N 3/2839
See application file for complete search history.

(56) References Cited

U.S. PATENT DOCUMENTS 4,002,433 A * 1/1977 Oser ..................... F01N 3/2853
60/299
5,065,576 A * 11/1991 Kanazawa .......... F01N 13/0097
60/299

(Continued)

FOREIGN PATENT DOCUMENTS

DE    11 2012 000 930 T5    11/2013
DE    10 2015 115 220 A1    4/2016

(Continued)

OTHER PUBLICATIONS

PCT/JP2021/006538, English translation of previously cited C3 (International Preliminary Report on Patentability (PCT/IPEA/409)) (Three (3) pages).

(Continued)

*Primary Examiner* — Anthony Ayala Delgado
(74) *Attorney, Agent, or Firm* — Crowell & Moring LLP

(57) ABSTRACT

An exhaust purification device includes a casing which accommodates a purifier that purifies exhaust gas of an engine mounted on a vehicle and in which a flow direction of the exhaust gas corresponds to a longitudinal direction of the casing, an inlet opening at a first longitudinal end of the casing, an outlet opening provided at a second longitudinal end of the casing, a first pipe connected to the inlet opening, and a second pipe connected to the outlet opening. A cross section of at least one of a connecting end of the first pipe for the casing and a connecting end of the second pipe for the casing is in a flattened shape as a dimension of the cross section in the longitudinal direction of the casing is shorter than a dimension of the cross section in a lateral direction of the casing.

5 Claims, 5 Drawing Sheets

(56) References Cited

U.S. PATENT DOCUMENTS

| | | | |
|---|---|---|---|
| 5,782,089 A * | 7/1998 | Machida | F01N 3/2857 |
| | | | 60/299 |
| 8,814,969 B2 * | 8/2014 | Nagasaka | B01D 46/0043 |
| | | | 422/177 |
| 9,097,156 B2 | 8/2015 | Nagata et al. | |
| 9,441,513 B2 * | 9/2016 | Mitsuda | B01D 53/9477 |
| 11,572,819 B2 * | 2/2023 | Niaz | B01F 25/431 |
| 2010/0000203 A1 | 1/2010 | Kowada | |
| 2011/0047963 A1 * | 3/2011 | Kasaoka | F01N 13/1877 |
| | | | 60/272 |
| 2011/0167808 A1 | 7/2011 | Kosaka et al. | |
| 2011/0283685 A1 * | 11/2011 | Kotrba | F01N 3/106 |
| | | | 60/286 |
| 2013/0097978 A1 * | 4/2013 | Nagasaka | F01N 13/1872 |
| | | | 55/332 |
| 2013/0305688 A1 * | 11/2013 | Kosaka | F01N 13/008 |
| | | | 60/272 |
| 2014/0234188 A1 * | 8/2014 | Hartland | F01N 3/2066 |
| | | | 423/212 |
| 2016/0053657 A1 * | 2/2016 | Quadri | F01N 3/28 |
| | | | 60/311 |
| 2016/0115847 A1 | 4/2016 | Chapman et al. | |
| 2019/0309671 A1 * | 10/2019 | Rajagopal | F01N 11/00 |
| 2022/0416624 A1 * | 12/2022 | Itaya | H02K 9/19 |

FOREIGN PATENT DOCUMENTS

| | | |
|---|---|---|
| EP | 2 123 878 A1 | 11/2009 |
| EP | 2 345 802 A2 | 7/2011 |
| EP | 2 682 575 A1 | 1/2014 |
| EP | 2 806 130 A1 | 11/2014 |
| JP | 2008-196328 A | 8/2008 |
| JP | 2009-78591 A | 4/2009 |
| JP | 2012-180806 A | 9/2012 |
| JP | 2012-193719 A | 10/2012 |
| JP | 2015-24815 A | 2/2015 |
| WO | WO 2008/096548 A1 | 8/2008 |
| WO | WO 2012/118149 A1 | 9/2012 |
| WO | WO 2012/127951 A1 | 9/2012 |

OTHER PUBLICATIONS

PCT/JP2021/006538, International Search Report dated Apr. 13, 2021 (Two (2) pages).

PCT/JP2021/006538, Japanese-language of Written Opinion (PCT/ISA/237) dated Apr. 5, 2021 (Four (4) pages).

PCT/JP2021/006538, Japanese-language of International Preliminary Report on Patentability (PCT/IPEA/409) (Four (4) pages).

English-language European Search Report issued in European application No. 21759986.9-1004 dated Feb. 10, 2023 (Six (6) pages).

* cited by examiner

EXHAUST PURIFICATION DEVICE

FIELD

The present disclosure relates to an exhaust purification device mounted on a vehicle.

BACKGROUND

Vehicles equipped with engines are provided with exhaust purification devices for purifying exhaust gas. A known exhaust purification device is configured by a DPF device including a filter (DPF) that collects particulate matter (PM) contained in the exhaust gas, and an SCR device including a catalyst for selective catalytic reduction (SCR) that reduces and purifies nitrogen oxides (NOx) contained in the exhaust gas. For example, Patent Document 1 discloses an installation structure for an exhaust purification device that includes an upstream casing in which an upstream oxidation catalyst and a DPF are accommodated, and a downstream casing in which an SCR catalyst and a downstream oxidation catalyst are accommodated. In this structure, the exhaust purification device is connected to side frames via brackets.

CITATION LIST

Patent Document

Patent Document 1: Japanese Laid-open Patent Publication No. 2009-78591

SUMMARY

Problems to be Solved

Although the exhaust gas flowed into a casing flows along a longitudinal direction of the casing, it is sometimes preferable for the casing to have a shorter dimension in the longitudinal direction in view of mountability on a vehicle and layout. However, shortening the casing causes downsizing of a catalyst (purifier) accommodated in the casing, and thus, making it difficult to enhance exhaust purification performance.

The exhaust purification device of the present disclosure has been devised in view of such problems, and one of the objects thereof is to shorten the casing by devising a pipe connected to the casing.

Means to Solve the Problem

This case has been made to solve at least a part of the above-mentioned problems, and can be realized as the following aspects or application examples.

(1) The exhaust purification device according to this application example includes: a casing which accommodates a purifier that purifies exhaust gas of an engine mounted on a vehicle, and in which a flow direction of the exhaust gas corresponds to a longitudinal direction of the casing; an inlet opening provided at a first longitudinal end of the casing to allow the exhaust gas to flow into the casing; an outlet opening provided at a second longitudinal end of the casing to allow the exhaust gas to flow out of the casing; a first pipe connected to the inlet opening; and a second pipe connected to the outlet opening. A cross section of at least one of a connecting end of the first pipe for the casing and a connecting end of the second pipe for the casing is in a flattened shape as a dimension of the cross section in the longitudinal direction of the casing is shorter than a dimension of the cross section in a lateral direction of the casing.

As such, with the cross section of at least one of the connecting ends of the first pipe and the second pipe formed into the shape whose dimension in the longitudinal direction of the casing is shorter than the dimension in the lateral direction of the casing, a longitudinal dimension occupied by the pipe in the casing becomes small when the pipe is connected to the longitudinal end of the casing. This realizes a shorter longitudinal dimension of the casing while ensuring the size of the purifier, and therefore, enhances mountability on the vehicle and layout flexibility of the exhaust purification device. Alternatively, if the longitudinal dimension of the casing is set to, for example, the maximum designable length, a purifier with larger capacity can be accommodated in the casing.

(2) In the exhaust purification device according to the present application example, at least one of the first pipe and the second pipe may include an outer pipe portion connected to the connecting end in the flattened shape at an outside of the casing; and a cross-sectional area of the connecting end in the flattened shape and a cross-sectional area of the outer pipe portion may be equal (or substantially equal) to each other in size.

By setting the cross-sectional areas to be equal to each other in size as such, the flow rate of the exhaust gas can be equalized and the resistance due to the change in the flow rate can be reduced.

(3) In the exhaust purification device according to the present application example, at least one of the connecting ends of the first pipe and the second pipe in the flattened shape may extend inside the casing and may be in contact with an inner surface of the casing.

As such, with the connecting end of the pipe in the flattened shape extending inside the casing and in contact with the inner surface, the casing is reinforced from the inside to have an increased strength.

(4) In the exhaust purification device according to the present application example, the connecting end of the first pipe and the connecting end of the second pipe may be both in the flattened shape; and the flattened shape may be an ellipse, a rectangle with rounded corners, or a track shape.

As such, when the connecting ends of the two pipes are both in the flattened shape, the longitudinal dimensions occupied by the pipes in the casing become smaller, which enables the casing to be even shorter while ensuring the size of the purifier. Alternatively, if the casing is designed to have a predetermined length, a purifier with larger capacity can be accommodated in the casing.

(5) In the exhaust purification device according to the present application example, the casing may accommodate a catalyst for selective catalytic reduction that serves as the purifier.

As such, since the casing accommodates the catalyst for selective catalytic reduction (SCR) that serves as the purifier, it is possible to secure the length of the SCR without enlarging the longitudinal dimension of the casing. This can lengthen the distance for the exhaust gas to pass through the SCR, so that the exhaust purification performance enhances.

(6) In the exhaust purification device according to the present application example, the casing may be mounted on the vehicle in an orientation such that the longitudinal direction coincides with a vehicle width direction of the vehicle.

Even if the casing is arranged in such an orientation, with the cross section of at least one of the connecting ends of the first pipe and the second pipe described above formed into the flattened shape, the length (capacity) of the purifier can be secured to enhance the exhaust purification performance while satisfying the vehicle width regulation.

Effects of Invention

According to the exhaust purification device of the present disclosure, by partially devising the cross section of the pipe connected to the casing that houses the purifier, it is possible to shorten the longitudinal dimension of the casing.

DESCRIPTION OF EMBODIMENT(S)

An exhaust purification device as an embodiment will now be described with reference to the drawings. The embodiment described below is merely an example and there is no intention to exclude application of various modifications and techniques not specified in the following embodiment. Each configuration of the present embodiment can be variously modified and implemented without departing from the gist thereof. In addition, it can be selected as needed or can be combined as appropriate.

[1. Overall Configuration]

Figure 1:
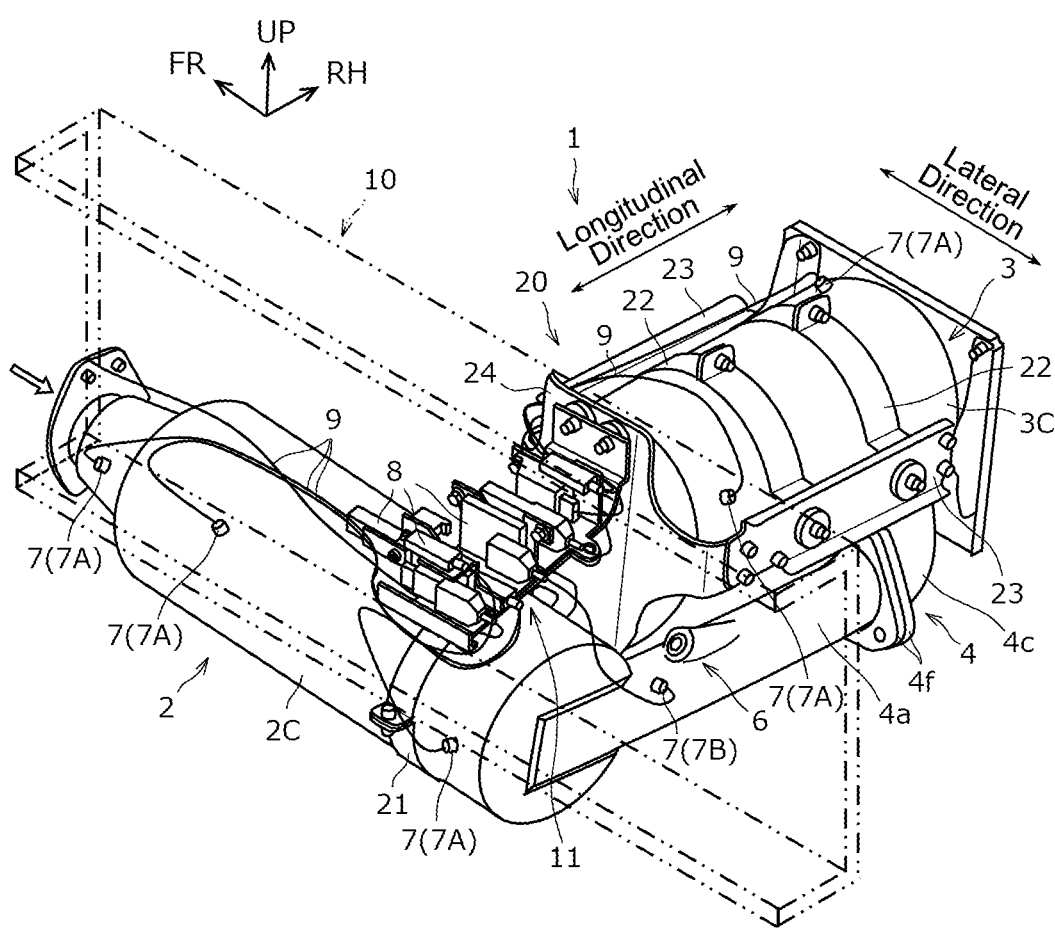
FIG. 1 is a schematic perspective view for explaining an exhaust purification device as an embodiment.

An exhaust purification device 1 of the present embodiment is a device that purifies exhaust gas discharged from an engine (for example, a diesel engine, not illustrated) mounted on a vehicle. The present embodiment exemplarily discloses, as illustrated in FIG. 1, the exhaust purification device 1 including a DPF device 2 and an SCR device 3. Further, the present embodiment exemplarily discloses a configuration in which the exhaust purification device 1 is attached to a side frame 10 (partially indicated by two-dot chain lines in FIG. 1). The side frame 10 is a frame member provided in a pair of left and right and extending in a vehicle front-rear direction, and is, for example, formed to have a U-shaped cross section.

The outlined arrow in FIG. 1 indicates flow of the exhaust gas that flows into the DPF device 2. The DPF device 2 is a purification device arranged on an upstream side in the exhaust purification device 1, and is configured by accommodating an upstream oxidation catalyst and a particulate filter (Diesel Particulate Filter, hereinafter referred to as "DPF"), each of which is not illustrated, in a first casing 2C formed into a cylinder. The upstream oxidation catalyst is an oxidation catalyst that oxidizes nitric oxide (NO) contained in the exhaust gas, hydrocarbons (HC) contained in unburned fuel, etc., and is configured by a catalytic substance supported by a honeycomb-shaped carrier. The DPF is a porous filter that collects particulate matter (Particulate Matter, hereinafter referred to as "PM") contained in the exhaust gas, and is arranged downstream of the upstream oxidation catalyst. The upstream oxidation catalyst and the DPF are purifiers for exhaust purification.

The SCR device 3 is a purification device arranged on a downstream side in the exhaust purification device 1, and is configured by accommodating a catalyst 3A for selective catalytic reduction (see FIG. 3, Selective Catalytic Reduction, hereinafter referred to as "SCR 3A") and a downstream oxidation catalyst 3B (see FIG. 3) in a second casing 3C formed in a cylinder. The SCR 3A is a catalyst that reduces and removes nitrogen oxides (NOx) contained in the exhaust gas, and is configured by a catalyst supported by a honeycomb-shaped carrier. The SCR 3A hydrolyzes additive (urea water) supplied from a reducing agent injector 6 provided on the upstream side of the SCR device 3 to ammonia ($NH_3$), adsorbs the ammonia, and reduces the NOx in the exhaust gas to nitrogen ($N_2$) by using the adsorbed ammonia as the reducing agent. The downstream oxidation catalyst 3B is an oxidation catalyst arranged downstream of the SCR 3A to remove excess ammonia in the reduction reaction in the SCR 3A, and is configured, for example, to be similar to the upstream oxidation catalyst. The SCR 3A and the downstream oxidation catalyst 3B are also purifiers for exhaust purification.

Longitudinal directions of the casings 2C and 3C both coincide with the flow direction of the exhaust gas. The exhaust purification device 1 of the present embodiment is mounted on the vehicle, in an orientation such that the longitudinal direction of the second casing 3C crosses the longitudinal direction of the first casing 2C at substantially right angles. More specifically, the first casing 2C is mounted in an orientation such that the longitudinal direction thereof substantially coincides with the vehicle front-rear direction, and the second casing 3C is mounted in an orientation such that the longitudinal direction thereof substantially coincides with a vehicle width direction.

The first casing 2C is provided with an inlet opening (not illustrated) to allow the exhaust gas to flow into the first casing 2C at a first longitudinal end (the end on a vehicle front side), and is also provided with an outlet opening (not illustrated) to allow the exhaust gas to flow out of the first casing 2C at a second longitudinal end (the end on a vehicle rear side). To the inlet opening of the first casing 2C, a pipe (not illustrated) that joins the engine to the DPF device 2 is connected. At least one of the pipe and an upstream end of the first casing 2C is fixed to the side frame 10 via a non-illustrated bracket or the like.

The second casing 3C is provided with an inlet opening 3d (see FIG. 3) to allow the exhaust gas to flow into the second casing 3C at a first longitudinal end (the end on a vehicle right side), and is also provided with an outlet opening 3e (see FIG. 3) to allow the exhaust gas to flow out of the second casing 3C at a second longitudinal end (the end on a vehicle left side). In each of FIGS. 3 and 5, the flow direction of the exhaust gas is indicated by an outlined arrow.

The exhaust purification device 1 is provided with two types of pipes 4 and 5. A first pipe 4 communicates the two casings 2C and 3C with each other, and constitutes a flow path that guides the exhaust gas which has flowed through the first casing 2C to the second casing 3C. Namely, an upstream end of the first pipe 4 is connected to the outlet opening of the first casing 2C, and a downstream end of the first pipe 4 is connected to the inlet opening 3d of the second casing 3C. The first pipe 4 of the present embodiment forms one pipe by two pipe members connected to each other via flanges 4f in a portion extending in the vehicle width direction. However, the first pipe 4 may be configured by a single pipe instead of being the split type.

Figure 2:
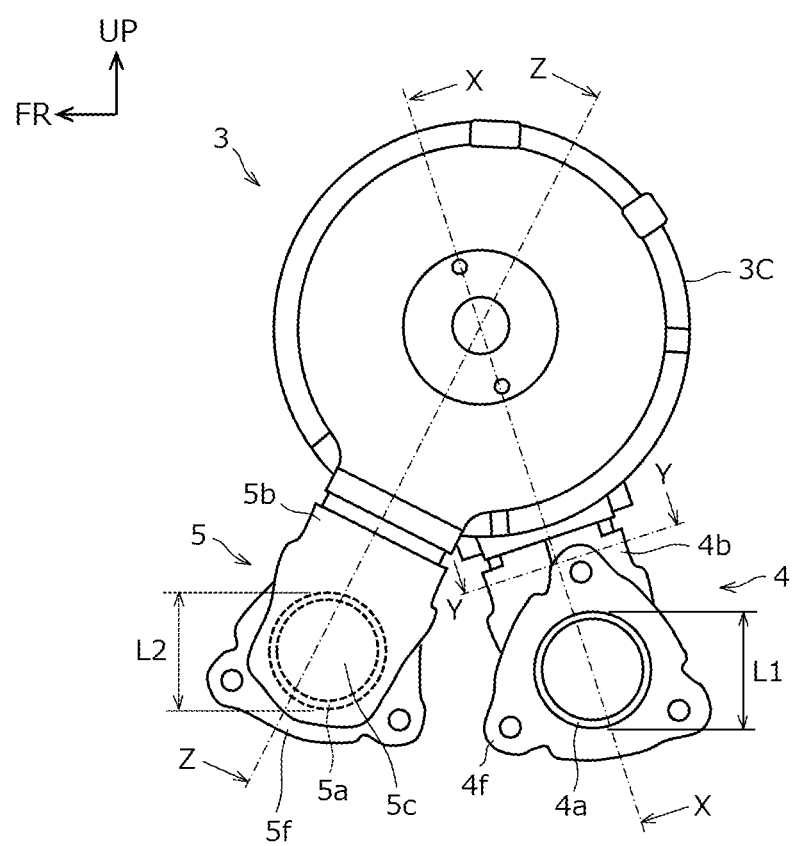
FIG. 2 is a side view illustrating an SCR device included in the exhaust purification device as the embodiment and pipes connected thereto.
Figure 5:
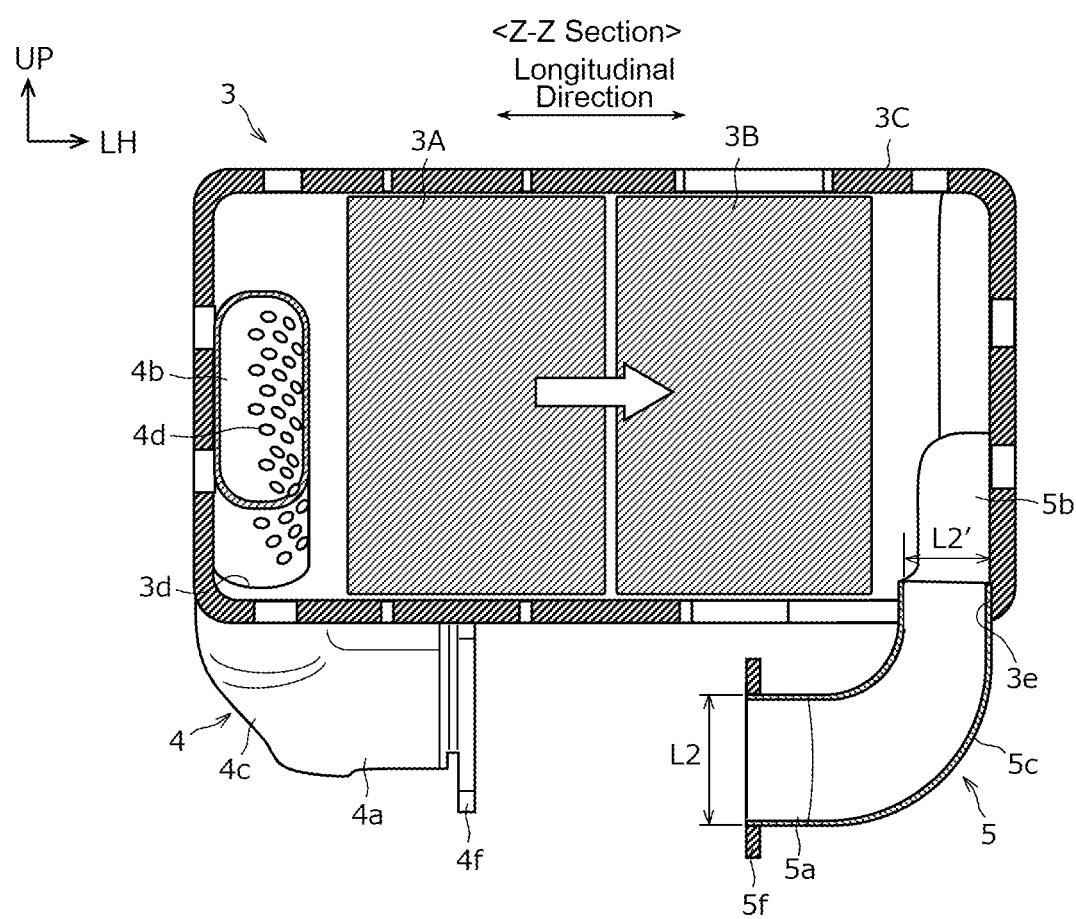
FIG. 5 is a cross-sectional view as seen from the arrow Z-Z of FIG. 2.

As illustrated in FIGS. 2 and 5, a second pipe 5 has an upstream end thereof connected to the outlet opening 3e of the second casing 3C, and constitutes a flow path that discharges the exhaust gas purified by the exhaust purification device 1 to the outside of the vehicle. As in the case of the first pipe 4, the second pipe 5 of the present embodiment also forms one pipe by two pipe members connected via flanges 5f in a portion extending in the vehicle width direction. However, the second pipe 5 may be configured by a single pipe instead of being the split type.

In the exhaust purification device 1 of the present embodiment, the first pipe 4 extends in the vehicle width direction and the reducing agent injector 6 described above is provided on the first pipe 4. The position of the reducing agent injector 6 is not limited to this, and may be, for example, a connection point between the first casing 2C and the first pipe 4, or in the first casing 2C if the upstream end of the first pipe 4 is placed in the first casing 2C.

The exhaust purification device 1 of the present embodiment has an attachment member 20 that attaches the two casings 2C and 3C to a vehicle body (the side frame 10 in the present embodiment), in a state where the first casing 2C and the second casing 3C are connected to each other. The attachment member 20 includes a DPF band 21 that holds an outer periphery of the first casing 2C, two SCR bands 22 that each hold an outer periphery of the second casing 3C, two side face portions 23 that sandwich the second casing 3C from the vehicle front-rear direction, and a connecting face portion 24 that connects the DPF band 21 to the side face portions 23.

The DPF band 21 holds a vehicle rear side portion of the first casing 2C, and is fastened to the connecting face portion 24. Each of the SCR bands 22 holds the second casing 3C at a different position in the longitudinal direction, and is fastened to the side face portions 23. The side face portions 23 are fastened to the connecting face portion 24. As such, in the exhaust purification device 1 of the present embodiment, the DPF device 2 and the SCR device 3 are mounted on the vehicle in a compact state.

The exhaust purification device 1 includes multiple sensors 7 provided on at least each of the first casing 2C and the second casing 3C to detect the condition of the exhaust gas flowing inside, and multiple controllers 8 that control each of the multiple sensors 7. Examples of the sensors 7 include a temperature sensor, a pressure sensor, a NOx sensor, a PM sensor, and an $NH_3$ sensor. The sensor designated by reference numeral 7A in FIG. 1 is a temperature sensor, and the sensor designated by the reference symbol 7B is a NOx sensor or an $NH_3$ sensor. The various types of sensors 7 may be arranged on, in addition to the casings 2C and 3C, the pipe on the upstream side of the first casing 2C, the first pipe 4, and/or the second pipe 5.

The controllers 8 are provided one for each sensor 7 and are connected to the corresponding sensors 7 via harnesses 9. Examples of the controllers 8 include a pressure sensor controller, a temperature sensor controller, a NOx sensor controller, a PM sensor controller, and an $NH_3$ sensor controller. The harnesses 9 are arranged along the peripheries of the first casing 2C and the second casing 3C, and are prevented from displacement by non-illustrated clips or the likes. In the exhaust purification device 1 of the present embodiment, the multiple controllers 8 are attached to a bracket 11 so as to be integrally arranged at one place, but alternatively, each of the controllers 8 may be arranged at the position of the corresponding sensor 7 to omit the bracket 11.

[2. Main Configuration]

Figure 3:
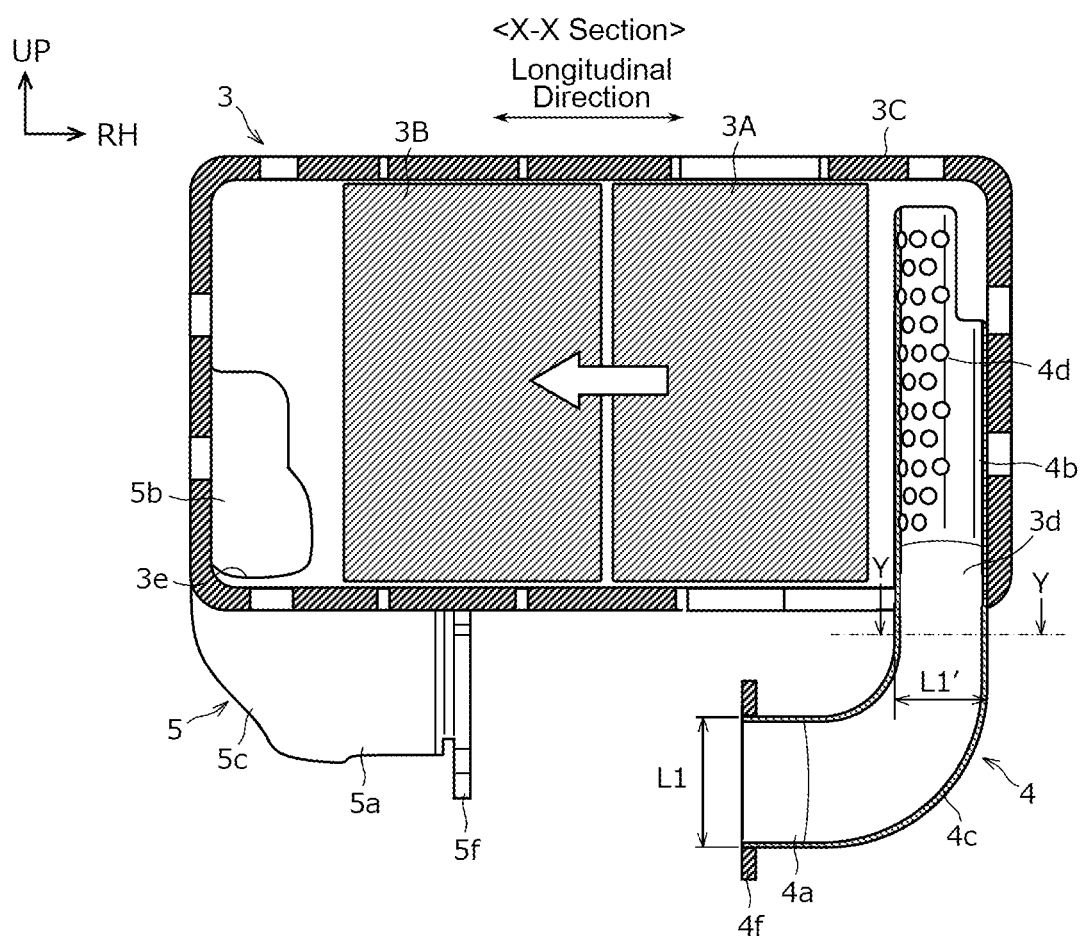
FIG. 3 is a cross-sectional view as seen from the arrow X-X of FIG. 2.
Figure 4:
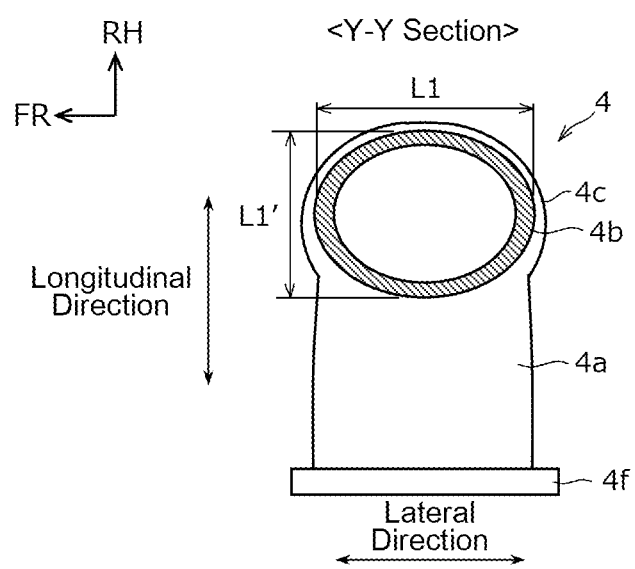
FIG. 4 is a cross-sectional view as seen from the arrow Y-Y of FIGS. 2 and 3.

Next, description will be made in relation to the structure of the two pipes 4 and 5 connected to the second casing 3C (hereinafter, simply referred to as "casing 3C") of the exhaust purification device 1, and the connection structure of each of the pipes 4 and 5 to the casing 3C. FIG. 2 is a side view illustrating a state in which each of the pipes 4 and 5 is connected to the casing 3C, and FIGS. 3 to 5 are cross-sectional views as seen from the arrows X-X, Y-Y, and Z-Z of FIG. 2, respectively. These figures illustrate each of the pipes 4 and 5 separated at each of the flanges 4f and 5f.

As illustrated in FIGS. 1 and 3, the first pipe 4 is formed in a substantially L-shape when viewed from the vehicle rear side (in a rear view). The first pipe 4 of the present embodiment includes a body 4a extending in the vehicle width direction, a corner 4c curving upward from an end on the vehicle outer side of the body 4a, and a connecting end 4b connected to the casing 3C. The body 4a, the corner 4c, and the connecting end 4b are continuous, and an extending direction of the body 4a is orthogonal to an extending direction of the connecting end 4b. In the present embodiment, the extending direction of the body 4a coincides with the longitudinal direction (vehicle width direction) of the casing 3C, and the extending direction of the connecting end 4b coincides with a lateral direction (if the casing 3C is a cylinder, a radial direction) of the casing 3C.

As illustrated in FIG. 2, a cross section of the body 4a of the present embodiment is substantially circular, and is uniform in a longitudinal direction (i.e., the vehicle width direction) of the body 4a. Hereinafter, an outer diameter of the cross section of the body 4a is defined as L1. As illustrated in FIG. 3, the cross section of the first pipe 4 changes from the body 4a to the connecting end 4b via the corner portion 4c. Specifically, while the cross section of the body 4a is substantially circular, as illustrated in FIG. 4, a cross section of the connecting end 4b is in a flattened shape as if the cross section of the body 4a is crushed (narrowed).

As illustrated in FIGS. 3 and 4, the cross section of the connecting end 4b is in the flattened shape as a dimension (longitudinal dimension L1') along the longitudinal direction of the casing 3C is shorter than a dimension (lateral dimension) along the lateral direction of the casing 3C. Although FIG. 4 illustrates the first pipe 4 in which the lateral dimension of the cross section of the connecting end 4b is equal to the outer diameter L1 of the cross section of the body 4a, the lateral dimension of the cross section of the connecting end 4b is not limited to this example. Further, although FIG. 4 illustrates the first pipe 4 in which the cross section of the connecting end 4b is substantially elliptic, the cross section may alternatively be in the flattened shape other than an ellipse (for example, a rectangle with rounded corners, a polygon, or a track shape). The "track shape" described here means a shape of a race track in an athletic field.

As illustrated in FIG. 3, in the first pipe 4 of the present embodiment, the connecting end 4b extends inside the casing 3C and is in contact with an inner surface (here, the end surface on the vehicle outer side) of the casing 3C. As such, by extending from the inlet opening 3d to a deep inside of the casing 3C and being arranged in contact with the inner surface of the casing 3C, the connecting end 4b has a function of reinforcing the casing 3C from the inner surface side of the casing 3C. A large number of holes 4d are formed through the connecting end 4b. The exhaust gas that has flowed through the first pipe 4 further flows into the casing 3C through these holes 4d.

As in the case of the first pipe 4, the second pipe 5 is also formed in a substantially L-shape when viewed from the vehicle rear side (in a rear view). As illustrated in FIG. 5, the second pipe 5 of the present embodiment includes a body 5a extending in the vehicle width direction, a corner 5c curving upward from an end on the vehicle inner side of the body 5a, and a connecting end 5b connected to the casing 3C. The body 5a, the corner 5c, and the connecting end 5b are continuous, and an extending direction of the body 5a is orthogonal to an extending direction of the connecting end 5b. In the present embodiment, the extending direction of the body 5a coincides with the longitudinal direction (vehicle width direction) of the casing 3C, and the extending direction of the connecting end 5b coincides with the lateral direction (if the casing 3C is a cylinder, the radial direction) of the casing 3C.

As illustrated in FIG. 2, in the present embodiment, a cross section of the body 5a of the second pipe 5 is also substantially circular, and is uniform in the longitudinal direction (i.e., the vehicle width direction) of the body 5a. Hereinafter, an outer diameter of the cross section of the body 5a is defined as L2. As in the case of the first pipe 4, the cross section of the second pipe 5 changes from the body 5a to the connecting end 5b via the corner 5c. Specifically, while the cross section of the body 5a is substantially circular, as illustrated in FIG. 5, a cross section of the connecting end 5b is in a flattened shape as if the cross section of the body 5a is crushed (narrowed).

As illustrated in FIG. 5, the cross section of the connecting end 5b is in the flattened shape as a dimension (longitudinal dimension L2') along the longitudinal direction of the casing 3C is shorter than a dimension (lateral dimension) along the lateral direction of the casing 3C. Although FIG. 5 illustrates the second pipe 5 in which the lateral dimension of the cross section of the connecting end 5b is equal to the outer diameter L2 of the cross section of the body 5a, the lateral dimension of the cross section of the connecting end 5b is not limited to this example. FIG. 5 illustrates the second pipe 5 in which the cross section of the connecting end 5b is in a substantial rectangle with rounded corners. It should be noted that the cross section of the connecting end 5b may be in another flattened shape (for example, an ellipse, a track shape, or a flattened polygon other than a rectangle).

As illustrated in FIG. 5, in the second pipe 5 of the present embodiment, the connecting end 5b extends inside the casing 3C and is in contact with the inner surface (here, the end surface on the vehicle inner side) of the casing 3C. As such, by extending from the outlet opening 3e to a deep inside of the casing 3C and being arranged in contact with the inner surface of the casing 3C, the connecting end 5b also has a function of reinforcing the casing 3C from the inner surface side of the casing 3C. The connecting end 5b of the second pipe 5 has an opening(s) in the casing 3C, and through the opening(s), the exhaust gas that has passed through the SCR 3A and the downstream oxidation catalyst 3B in the casing 3C flows into the second pipe 5 to be discharged to the outside.

In the exhaust purification device 1 of the present embodiment, as illustrated in FIG. 2, the first pipe 4 is connected to a lower and diagonally rear side of the casing 3C, and the second pipe 5 is connected to a lower and diagonally front side of the casing 3C. Accordingly, interference between the two pipes 4 and 5 are avoided.

[3. Actions and Effects]

In the exhaust purification device 1 described above, the inlet opening 3d is provided at the first longitudinal end of the casing 3C which accommodates the SCR 3A and the downstream oxidation catalyst 3B as the purifiers, and the outlet opening 3e is provided at the second longitudinal end. In addition, the cross section of at least one of the connecting ends 4b and 5b of the pipes 4 and 5 connected to these openings 3d and 3e is in the flattened shape as the longitudinal dimension L1', L2' along the casing 3C is shorter than the lateral dimension L1, L2.

As such, with the cross section of the connecting end 4b, 5b of the pipe 4, 5 formed into the shape whose longitudinal dimension L1', L2' along the casing 3C is shorter than the lateral dimension L1, L2, a longitudinal dimension occupied by the pipe 4, 5 in the casing 3C becomes small when the pipe 4, 5 is connected to the longitudinal end of the casing 3C. For example, assuming that the longitudinal dimension of the casing 3C is 100, the shorter the longitudinal dimension L1', L2' of the connecting end 4b, 5b of the pipe 4, 5 is, the closer to 100 the longitudinal dimension of the purifier arranged in the casing 3C becomes.

Therefore, by devising the pipe 4, 5 connected to the casing 3C, it is possible to shorten the casing 3C while ensuring the size of the purifier. This enhances mountability on the vehicle and layout flexibility of not only the SCR device 3 but also the exhaust purification device 1. Alternatively, if the longitudinal dimension of the casing 3C is set to, for example, the maximum designable length, a purifier with larger capacity can be accommodated in the casing 3C.

According to the exhaust purification device 1 described above, since the connecting end 4b, 5b of the pipe 4, 5 extends inside the casing 3C and is in contact with the inner surface of the casing 3C, the strength of the casing 3C can be increased.

According to the exhaust purification device 1 described above, since the connecting end 4b of the first pipe 4 and the connecting end 5b of the second pipe 5 are both in the flattened shape, the longitudinal dimensions occupied by the two pipes 4 and 5 in the casing 3C become smaller. This enables the casing 3C to be even shorter while ensuring the size of the purifier. Alternatively, if the casing 3C is designed to have a predetermined length, a purifier with larger capacity can be accommodated in the casing 3C.

In the exhaust purification device 1 described above, since the casing 3C accommodates the SCR 3A that serves as the purifier, it is possible to secure the length of the SCR 3A without enlarging the longitudinal dimension of the casing 3C. This can lengthen the distance for the exhaust gas to pass through the SCR 3A, which contributes to enhancement of the exhaust purification performance.

In the exhaust purification device 1 described above, the casing 3C is mounted on the vehicle in the orientation such that the longitudinal direction of the casing 3C coincides with the vehicle width direction. In other words, even if the casing 3C is arranged in such an orientation, according to the exhaust purification device 1 that adopts the connection structure of the pipe 4, 5 described above, the length (capacity) of the purifier can be secured to enhance the exhaust purification performance while satisfying the vehicle width regulation.

[4. Modifications]

The configuration of the exhaust purification device 1 described above is an example. Although the exhaust purification device 1 described above illustrates a case where the connecting ends 4b and 5b of the two pipes 4 and 5 are both in the flattened shape, as long as at least one of the connecting ends 4b and 5b is in the flattened shape, the longitudinal dimension occupied by the pipe 4, 5 in the casing 3C can be small when the pipe 4, 5 is connected to the longitudinal end of the casing 3C. In addition, each shape of the cross sections of the bodies 4a and 5a of the pipes 4 and 5 is not limited to a circle.

The connecting ends 4b and 5b of the pipes 4 and 5 described above both extend inside the casing 3C and are in contact with the inner surface of the casing 3C, but the connecting ends 4b and 5b may be arranged in a non-contact manner with respect to the inner surface of the casing 3C. Further, the connecting ends 4b and 5b do not have to extend inside the casing 3C. For example, an opening may be provided at an end surface of the connecting end of the first pipe, and the connecting end may be connected to the casing 3C so that the opening on this end surface communicates with the inlet opening 3d. The connecting end of the second pipe may be configured in a manner similar to this.

The purifier accommodated in the casing that adopts the structure of the connection portion described above is not limited to the SCR 3A and the downstream oxidation catalyst 3B. In other words, the above-described flattened shape may be applied to a cross section of a connecting end of a pipe that is connected to a casing which accommodates other purifiers instead of or in addition to the SCR 3A and the downstream oxidation catalyst 3B.

The arrangement of the DPF device 2 and the SCR device 3 is not limited to the above. For example, these devices 2 and 3 may be oppositely arranged, may be arranged in parallel, or may be arranged so as to extend in the vehicle front-rear direction (along a substantially straight line). The method for fixing the DPF device 2 and the SCR device 3 to the vehicle body may be any method other than the one using the attachment member 20 described above. An exhaust purification device may be provided, which accommodates, in place of or in addition to the DPF device 2 and the SCR device 3, another purifier such as an SCRF (Selective Catalytic Reduction on filter) with a filter coated with a selective reduction catalyst. When an exhaust purification device accommodating the SCRF instead of the DPF device 2 is provided, the reducing agent injector 6 described above may be provided on the casing that accommodates the SCRF.

The cross-sectional area of the body 4a and/or the cross-sectional area of the corner 4c of the first pipe 4 can be made equal to the cross-sectional area of the connecting end 4b in size. By setting the areas to be equal to each other in size (the areas almost equal in size are sufficient) as such, the flow rate of the exhaust gas can be substantially equalized between the body 4a and/or the corner 4c and the connecting end 4b, and the resistance due to the change in the flow rate can be reduced. Similarly, the cross-sectional area of the body 5a and/or the cross-sectional area of the corner 5c of the second pipe 5 can be made equal to the cross-sectional area of the connecting end 5b in size (the areas almost equal in size are sufficient). In this case as well, the resistance due to the change in the flow rate can be reduced in the same manner as described above.

In this modification, the body 4a and the corner 4c of the first pipe, and the body 5a and the corner 5c of the second pipe each correspond to an outer pipe portion, but the outer pipe portion is not limited to these, and may be any pipe portions outside the casing that connects to the connecting end 4b or the connecting end 5b.

The above-described embodiment regards the direction in which the exhaust gas in the second casing 3C passes through the purifier as the longitudinal direction, and the direction orthogonal to the longitudinal direction as the lateral direction, but the present invention may be applied to a casing whose length along a direction in which the exhaust gas passes through the purifier is shorter than a length along an orthogonal direction to the direction in which the exhaust gas passes through the purifier, for example. Although the present specification mentions the longitudinal direction and the lateral direction, for convenience, the longitudinal direction expresses the direction in which the exhaust gas in the casing passes through the purifier, and the lateral direction expresses the orthogonal direction to the direction in which the exhaust gas in the casing passes through the purifier.

DESCRIPTION OF REFERENCE SYMBOLS 1 exhaust purification device
3A SCR catalyst (purifier)
3C second casing (casing)
3d inlet opening
3e outlet opening
4 first pipe
4b connecting end
5 second pipe
5b connecting end

The invention claimed is:

1. An exhaust purification device, comprising:
a casing which accommodates a purifier that purifies exhaust gas of an engine mounted on a vehicle, and in which a flow direction of the exhaust gas corresponds to a longitudinal direction of the casing;
an inlet opening provided at a first longitudinal end of a side face of the casing to allow the exhaust gas to flow into the casing;
an outlet opening provided at a second longitudinal end of the side face of the casing to allow the exhaust gas to flow out of the casing;
a first pipe connected to the inlet opening; and
a second pipe connected to the outlet opening, wherein
at least one of a connecting end of the first pipe for the casing and a connecting end of the second pipe for the casing extends in a lateral direction of the casing from an outside of the casing and is connected to at least one of the inlet opening and the outlet opening, and a cross section of the at least one of the connecting ends when cut along the longitudinal direction of the casing is in a flattened shape as a dimension of the cross section in the longitudinal direction of the casing is shorter than a dimension of the cross section in a lateral direction of the casing;
at least one of the connecting ends of the first pipe and the second pipe in the flattened shape extends inside the casing and is in contact with an inner surface of the casing.

2. The exhaust purification device according to claim 1, wherein:
at least one of the first pipe and the second pipe includes an outer pipe portion connected to the connecting end in the flattened shape at an outside of the casing; and
a cross-sectional area of the connecting end in the flattened shape and a cross-sectional area of the outer pipe portion are equal to each other in size.

3. The exhaust purification device according to claim 1, wherein:
the connecting end of the first pipe and the connecting end of the second pipe are both in the flattened shape; and
the flattened shape is an ellipse, a rectangle with rounded corners, or a track shape.

4. The exhaust purification device according to claim 1, wherein the casing accommodates a catalyst for selective catalytic reduction that serves as the purifier.

5. The exhaust purification device according to claim 1, wherein the casing is mounted on the vehicle in an orientation such that the longitudinal direction coincides with a vehicle width direction of the vehicle.

\* \* \* \* \*